UNITED STATES PATENT OFFICE 2,280,290

METHOD OF PREPARING ααβ-TRIHALOGEN SUBSTITUTED BUTYRALDEHYDES

Le Roy B. High, Detroit, Mich., assignor to The Udylite Corporation, Detroit, Mich., a corporation of Delaware No Drawing. Application January 13, 1940,
Serial No. 313,688

12 Claims. (Cl. 260—601)

This invention relates to a new and improved method of making organic compounds and in particular to a method of preparing ααβ-trihalogen substituted butyraldehydes, especially ααβ-trichlorobutyraldehyde, and ααβ-tribromobutyraldehyde.

The methods published in the literature with which I am familiar are slow and cumbersome and tend to give materials which are heavily contaminated with impurities. This means not only that the products obtained must be carefully purified but also that the yields are correspondingly low.

The methods previously used fall in two groups, direct chlorination of acetaldehyde or paraldehyde, and preparation of α-chloro crotonaldehyde and chlorination of it.

According to the first general method acetaldehyde is treated with dry chlorine gas first at 0° C. and later at slowly rising temperature up to 100° C. The reaction is strongly exothermic and requires exceedingly close control, it taking four days to completely chlorinate one pound of acetaldehyde. To the resulting crude product is added concentrated H₂SO₄, the mixture is distilled, and this product fractionated to obtain the desired ααβ-trichlorobutyraldehyde.

When paraldehyde is used for starting material the same procedure is followed except that slightly less rigorous temperature control is necessary.

The second method requires the preliminary preparation of α-chloro crotonaldehyde. Several methods are known, most of them starting with acetaldehyde or acetaldehyde plus chloracetaldehyde. The α-chlorocrotonaldehyde is then treated with chlorine gas to give the desired product.

It appeared to me that the ααβ-trichlorobutyraldehyde could easily be made from crotonaldehyde on account of the double bond and the high reactivity of the α-hydrogen atoms. However, direct chlorination of crotonaldehyde gave αβ-dichlorobutyraldehyde only, and the ααβ-trichlorobutyraldehyde could not be prepared in this manner even with the help of several catalysts. I have no explanation for this anomalous behavior.

I then discovered a very simple method for making the ααβ-trichlorobutyraldehyde from croton aldehyde. I first treat the crotonaldehyde with dry hydrogen chloride to prepare the β-chlorobutyraldehyde. Dry chlorine gas is then substituted for the hydrogen chloride to complete the reaction to the ααβ-trichloro compound.

The reaction formulas are probably as follows:

$CH_3.CH=CH.CHO+HCl \rightarrow CH_3.CH(Cl).CH_2.CHO$

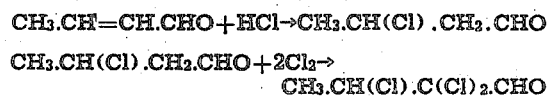

The details of the method are as follows:

In a vessel fitted with a cooling coil, stirrer and thermometer, inlet tube for HCl gas and Cl₂ gas, and an outlet tube, is added about one-half of its capacity of crotonaldehyde. Dry HCl gas is passed in while the temperature is maintained at 0-10° C., preferably close to 0° C. The lower the temperature the less is the formation of resins and the higher is the yield. The rate of introduction of HCl is governed by the effectiveness of cooling, the reaction being exothermic. The efficiency of this process is high in that the HCl is absorbed instantaneously to the end. When HCl passes through the mixture without reacting, the reaction is complete. The time of this reaction has varied between one and two hours, using a five pound batch.

At the end of the reaction a condenser is attached to the outlet tube, the temperature is raised to 50° C. and Cl₂ gas is added rapidly. The temperature must be at least 50° C. to make the reaction go rapidly. The temperature may go as high as 150° C., but 95°-100° C. is preferred to allow water but not much compound to distill over. The condensate is separated and the top layer of water is discarded while the lower layer is returned to the reaction chamber. This reaction is also highly efficient, no Cl₂ gas coming out until it is nearly completed. At this point the temperature is allowed to rise. It will reach a peak at about 130°-140° C. and then drop rather rapidly. Then the flow of chlorine is stopped. This reaction consumed from two to four hours using a five pound batch.

The resultant liquid is now transferred to a still and fractionated, preferably under reduced pressure. The free HCl dissolved in the liquid is largely removed during evacuation. The low boiling point fraction is very small and is returned to be used with the next distillation. The ααβ-trichlorobutyraldehyde has a boiling point of about 163°-165° C. at atmospheric pressure, 70° C. at 3.0 mm. and 49° C. at .3 mm. mercury. A small amount of resin is left in the still. The yield is at least 75% and generally higher, figured on crotonaldehyde.

It is seen that the second reaction produces 2 mols. of HCl to make 1 mol. of ααβ-trichlorobutyraldehyde, and that the first reaction requires only 1 mol. HCl. Therefore, after one batch of the β-product has been made with fresh HCl gas, subsequent batches can be prepared using the HCl given off by the second reaction. We actually prefer to work with three batches at the same time. Batch 3 consists of the β-product being reacted with $Cl_2$ gas. Batch 2 consists of β-chlorobutyraldehyde into which the gaseous by-products, HCl and $Cl_2$, from batch 3 are led. Batch 1 is fresh crotonaldehyde through which is led any HCl gas which is not being absorbed by batch 2. The excess HCl not absorbed during the process may be used for other purposes if desired. When batch 3 is fully reacted, it is removed to the still. Batch 2 is treated as batch 3 above, batch 1 as batch 2 above and a new batch is treated as batch 1 above. Undoubtedly arrangements could be made for continuous treatment according to the counter current principle.

Other trihalogen substituted butyraldehydes have been prepared by me in a similar manner. Thus ααβ-tribromobutyraldehyde was prepared by treating crotonaldehyde first with HBr gas and then with $Br_2$, either as a gas or a liquid. The heat or reaction with $Br_2$ is not very high, making it possible to use $Br_2$ gas without difficulties with cooling of the reaction mass. Similarly, αα-dibromo β-chloro butyraldehyde has been prepared by treating crotonaldehyde first with HCl gas and then with $Br_2$. αα-dichloro β-bromo butyraldehyde can be prepared by treating crotonaldehyde first with dry hydrogen bromide gas and then with chlorine ($Cl_2$).

The brom substituted compounds are preferably steam distilled for purification on account of their higher boiling point and lesser stability at high temperature.

The trihalogen substituted aldehydes are often used in the hydrated form as the hydrates are less corrosive and possibly more stable. To prepare the ααβ-trichlorobutyraldehyde hydrate about 60 parts by weight of the aldehyde may be mixed with about 40 parts by weight of water. The mixture is heated to about 75° C. at which temperature the solution may form two phases, either two layers or a cloudy mixture. The solution is allowed to cool when it becomes homogeneous. It comes down as a thick slurry of solid hydrate in water. The water may be separated by centrifuging. If the solution does not become homogeneous on cooling, more water may be added, the solution reheated to 75° C. and then allowed to cool again.

Glass, glass lined, lead lined, or ceramic equipment may be used throughout the process.

The prime advantages of my new process are its speed and simplicity and the high yields obtained.

I claim:

1. A method for preparing ααβ-trihalogen-substituted butyraldehyde comprising the steps of treating to saturation crotonaldehyde with a dry hydrogen halide from the group consisting of hydrogen chloride and hydrogen bromide, controlling the temperature of the reaction mass to control the yield of β-halogen butyraldehyde and then halogenating the resultant product with a dry gaseous halogen from the group consisting of chlorine and bromine.

2. A method for preparing ααβ-trihalogen-substituted butyraldehyde comprising the steps of treating to saturation crotonaldehyde with a dry hydrogen halide from the group consisting of hydrogen chloride and hydrogen bromide at a temperature falling within a range from approximately 0° to 10° C. and then halogenating the resultant product with a dry gaseous halogen from the group consisting of chlorine and bromine.

3. A method for preparing ααβ-trihalogen-substituted butyraldehyde comprising the steps of introducing a dry hydrogen halide from the group consisting of hydrogen chloride and hydrogen bromide into crotonaldehyde until the hydrogen halide passes through the mixture without reacting, and cooling the reaction mass to obtain a high yield of β-halogen butyraldehyde and then halogenating the resultant product with a dry gaseous halogen from the group consisting of chlorine and bromine.

4. A method for preparing ααβ-trihalogen-substituted butyraldehyde comprising the steps of treating to saturation crotonaldehyde with a dry hydrogen halide from the group consisting of hydrogen chloride and hydrogen bromide at a temperature falling within a range from approximately 0° to 10° C. and then halogenating the resultant product with a dry gaseous halogen from the group consisting of chlorine and bromine at a temperature falling within a range from approximately 50° C. to 150° C.

5. A method for preparing ααβ-trihalogen-substituted butyraldehyde comprising the steps of introducing to saturation a dry hydrogen halide gas from the group consisting of hydrogen chloride and hydrogen bromide into crotonaldehyde while cooling the mixture to maintain the same at a temperature within a range from 0° to 10° C. to form β-halogen butyraldehyde, and then introducing a dry halogen from the group consisting of chlorine and bromine into the β-halogen butyraldehyde while maintaining the temperature within a range from about 50° C. to 150° C.

6. A method for making ααβ-trichloro butyraldehyde comprising the steps of treating crotonaldehyde with dry hydrogen chloride to saturation, and cooling the reaction mass to obtain a high yield of β-chlorobutyraldehyde and then chlorinating the resultant product with dry chlorine gas.

7. A method for making ααβ-trichloro butyraldehyde comprising the steps of treating crotonaldehyde with dry hydrogen chloride to saturation at a temperature falling within a range from approximately 0° to 10° C. and then chlorinating the resultant product with dry chlorine gas.

8. A method for making ααβ-trichloro butyraldehyde comprising the steps of treating crotonaldehyde with dry hydrogen chloride to saturation at a temperature falling within a range from approximately 0° to 10° C. and then chlorinating the resultant product with dry chlorine gas at a temperature falling within a range from approximately 50° C. to 150° C.

9. A method for making ααβ-tribromo butyraldehyde comprising the steps of treating crotonaldehyde with dry hydrogen bromide to saturation, cooling the reaction mass to obtain a high yield of β-bromobutyraldehyde, and then reacting the resultant product with bromine ($Br_2$).

10. A method for making ααβ-tribromo butyraldehyde comprising the steps of treating crotonaldehyde with dry hydrogen bromide to saturation at a temeprature falling within a range from approximately 0 to 10° C. and then reacting the resultant product with bromine ($Br_2$) at a temperature falling within a range from approximately 50° C. to 150° C.

11. A method for making αα-dibromo β-chloro butyraldehyde comprising the steps of treating crotonaldehyde with dry hydrogen chloride gas to saturation, cooling the reaction mass to obtain a high yield of β-chlorobutyraldehyde and then treating the resultant product with bromine ($Br_2$).

12. A method for making αα-dichloro β-bromo butyraldehyde comprising the steps of treating crotonaldehyde with dry hydrogen bromide gas to saturation, cooling the reaction mass to obtain a high yield of β-chlorobutyraldehyde and then treating the resultant product with chlorine ($Cl_2$).

LE ROY B. HIGH.

Certificate of Correction

Patent No. 2,280,290.　　　　　　　　　　　　　　　　April 21, 1942.

LE ROY B. HIGH.

It is hereby certified that error appears in the printed specification of the above numbered patent requiring correction as follows: Page 3, second column, line 5, claim 12, for "β-chlorobutyraldehyde" read β-bromobutyraldehyde; and that the said Letters Patent should be read with this correction therein that the same may conform to the record of the case in the Patent Office.

Signed and sealed this 16th day of June, A. D. 1942.

[SEAL]

HENRY VAN ARSDALE,
*Acting Commissioner of Patents.*